(12) United States Patent
Feick (10) Patent No.: US 12,049,246 B2
(45) Date of Patent: Jul. 30, 2024

(54) WHEELBARROW AND KIT FOR ASSEMBLING SAME

(71) Applicant: William Kurt Feick, New Braunfels, TX (US)

(72) Inventor: William Kurt Feick, New Braunfels, TX (US)

( * ) Notice: Subject to any disclaimer, the term of this patent is extended or adjusted under 35 U.S.C. 154(b) by 0 days.

(21) Appl. No.: 18/345,386

(22) Filed: Jun. 30, 2023

(65) Prior Publication Data

US 2023/0347953 A1 Nov. 2, 2023

Related U.S. Application Data

(63) Continuation of application No. 17/491,053, filed on Sep. 30, 2021, now Pat. No. 11,738,789.

(51) Int. Cl.
*B62B 1/18* (2006.01)

(52) U.S. Cl.
CPC ...................... *B62B 1/18* (2013.01)

(58) Field of Classification Search
CPC ........... B62B 1/18; B62B 1/206; B62B 1/208; B62B 1/20; B62B 1/24; B62B 5/062; B62B 5/064; B62B 5/065; B62B 5/06; B62B 5/067
See application file for complete search history.

(56) References Cited

U.S. PATENT DOCUMENTS

| | | | |
|---|---|---|---|
| 633,648 A * | 9/1899 | Kauffman | B62B 5/067 280/47.31 |
| 2,918,239 A | 5/1956 | Wirth | |
| 2,797,125 A * | 6/1957 | Vogler | B62B 1/206 296/35.3 |
| 4,627,146 A | 12/1986 | Ward | |
| 5,127,762 A * | 7/1992 | Havlovitz | F16B 7/042 403/328 |
| 5,149,116 A * | 9/1992 | Donze | B62B 1/22 D34/16 |
| 5,915,706 A * | 6/1999 | Mosley | B62B 5/06 280/47.26 |
| 6,923,469 B2 * | 8/2005 | Tomchak | B62B 1/208 280/654 |
| 7,775,531 B2 * | 8/2010 | Zimmerman | B62B 1/22 298/3 |
| 7,866,686 B2 * | 1/2011 | Conaway | B62B 1/208 280/653 |
| 8,474,856 B2 * | 7/2013 | Hawkes | B62D 63/064 280/47.18 |

(Continued)

*Primary Examiner* — James M Dolak
(74) *Attorney, Agent, or Firm* — David O. Simmons; IVC Patent Agency (57) ABSTRACT

Disclosed herein are aspects of wheelbarrows and other similar types of wheeled material transport structures that comprise a plurality of interconnected discrete structural components implemented in a manner that enhances and maintains structural rigidity at the interconnections between such components. In particular, Advantageously, implementation of the interconnected discrete structural components in a manner that enhances and maintains structural rigidity at the interconnections thereof improves operability and longevity of use of wheelbarrows and other similar types of wheeled material transport structures utilize such an implementation of the interconnected discrete structural components.

14 Claims, 6 Drawing Sheets

(56) References Cited

U.S. PATENT DOCUMENTS

| | | | |
|---|---|---|---|
| 8,544,874 B2* | 10/2013 | Cooper | B62B 1/12 |
| | | | 280/659 |
| 9,174,658 B2* | 11/2015 | Higgins | B62B 1/208 |
| 9,682,718 B2* | 6/2017 | Hiestand | B62B 1/20 |
| 10,632,518 B2 | 4/2020 | Bouey et al. | |
| 11,117,602 B2* | 9/2021 | Green | B62B 1/20 |
| 11,738,789 B2* | 8/2023 | Feick | B62B 1/206 |
| | | | 280/47.31 |
| 2003/0218305 A1* | 11/2003 | Nicolay | B62B 5/06 |
| | | | 280/47.315 |
| 2004/0256838 A1 | 12/2004 | Shapiro | |
| 2012/0126502 A1* | 5/2012 | Robinson | B62B 1/204 |
| | | | 280/47.31 |
| 2013/0200582 A1 | 8/2013 | Feick | |
| 2014/0091540 A1 | 4/2014 | Frenkel | |
| 2014/0246838 A1 | 9/2014 | Albert et al. | |
| 2015/0042055 A1 | 2/2015 | Higgins | |
| 2021/0101631 A1 | 4/2021 | Green | |
| 2021/0114641 A1 | 4/2021 | Chenge | |

* cited by examiner

WHEELBARROW AND KIT FOR ASSEMBLING SAME

CROSS-REFERENCE TO RELATED APPLICATIONS

This patent application claims priority as a continuation from co-pending United States Non-Provisional Patent Application having Ser. No. 17/491,053, filed 30 Sep. 2021, entitled "WHEELBARROW AND KIT FOR ASSEMBLING SAME", having a common applicant herewith and being incorporated herein in its entirety by reference.

FIELD OF THE DISCLOSURE

The disclosures made herein relate generally to wheeled material transport structures and, more particularly, to multi-component wheelbarrows configured to be assembled in a manner that provides for structural rigidity.

BACKGROUND

Wheelbarrows are well known to be useful for manually carrying heavy loads. Wheelbarrows are often used to move loads across uneven ground, un-level and/or soft surfaces. They generally include a tub (i.e., a tray or bin), at least one wheel, a frame having a pair of legs and a pair of handles attached thereto. These components are often discrete items that are interconnected via mechanical fasteners (e.g., screws, bolts, nuts, washers and the like). These components being in the form of discrete items is beneficial from the standpoints of manufacturing, shipping, warehousing and the like.

A wheelbarrow is moved by lifting its handles to raise the legs off the ground, balancing the wheelbarrow on its wheel(s), and then walking while pushing or pulling the handles in a desired direction. A key attribute of wheelbarrows is their ability to easily dump a load being carried within the tub. A wheelbarrow is typically unloaded by lifting the handles to tip the tub into a vertical position where the load slides out a sloped front end portion of the tub. Often, in order to dump the load out of the tub completely, a wheelbarrow user is required to shake and rock the wheelbarrow back and forth and to sometimes tilt the tub over beyond the vertical position.

As the weight of the load being carried by a wheelbarrow increases, it often becomes more difficult to carry the load, to balance the wheelbarrow while moving the load and to dump the load. The increased weight of the load results in increased forces being exerted on the structure of the wheelbarrow during all aspects of use thereof. Most notably, the tub, legs, handles and interconnections between exhibit exertion of such increased forces thereon. Oftentimes, forces exerted on these components of the wheelbarrow and interconnections thereof (even with loads within general specifications and intended use of a wheelbarrow) result in the interconnection between the aforementioned components exhibiting diminished structural integrity. A common problem further diminishing the ability to keep components fastened with structural integrity is the loosening of fasteners during transport of a wheelbarrow between jobs carried on naturally vibrating trucks. Hence, there is a general objective to be less reliant on fasteners for structural integrity and to reduce the variability of joint integrity due to assembly mistakes. As a result, these components tend to deflect and/or displace relative to each other and thereby further compromise the structural integrity of the interconnections and, in the process, adversely impacting operability of the wheelbarrow—e.g., more difficult to balance the wheelbarrow, requiring more effort to move the wheelbarrow, more effort to dump the wheelbarrow and the bending or fracturing of parts.

Therefore, a wheelbarrow (or other similar types of wheeled material transport structures) that comprises a plurality of interconnected discrete structural components and that overcomes or substantially mitigates the aforementioned structural rigidity drawbacks associated with conventional wheelbarrows would be beneficial, desirable and useful.

SUMMARY OF THE DISCLOSURE

Embodiments of the disclosures made herein are directed to structural considerations of wheelbarrows and other similar types of wheeled material transport structures. More specifically, embodiments of the disclosures made herein are directed to wheelbarrows and other similar types of wheeled material transport structures that comprise a plurality of interconnected discrete structural components implemented in a manner that enhances and maintains structural rigidity at the interconnections between such components. Advantageously, implementation of the interconnected discrete structural components in a manner that enhances and maintains structural rigidity at the interconnections thereof improves operability and longevity of use of wheelbarrows and other similar types of wheeled material transport structures that utilize such an implementation of the interconnected discrete structural components. Additionally, such implementation minimizes the number of fasteners to alleviate chances of joint failure due to incorrect torquing of the fasteners and at the same time makes it easier and quicker to assemble the wheelbarrow by either stores or inexperienced end-users. A skilled person will appreciate that such an implementation of the interconnected discrete structural components enhances the utility and value of wheelbarrows and other similar types of wheeled material transport structures that are intended to be shipped in an unassembled format.

In one or more embodiments of the disclosures made herein, a wheelbarrow comprises a frame, support legs, a leg brace and handles. The frame has spaced-apart handle engaging bodies each at a rear portion of the frame. The support legs are each engaged in a spaced-apart manner to the rear portion of the frame and extend from the bottom side of the frame. The leg brace is coupled to the frame and to each of the support legs. The handles each have a frame engaging body that is engaged with a respective one of the handle mounting bodies of the frame to jointly define a respective handle coupling. Each handle coupling comprises a first tubular member, a second tubular member and a third tubular member. The second tubular member is engaged within a central passage of the first tubular member. The first tubular member is engaged within a central passage of the third tubular member. The second tubular member extends from within the central passage of the third tubular member into the central passage of the first tubular member.

In one or more embodiments of the disclosures made herein, a wheelbarrow comprises a frame, support legs, a leg brace and handles. The frame has spaced-apart handle engaging bodies each at a rear portion of the frame. The support legs are each engaged in a spaced-apart manner with the rear portion of the frame and extend from the bottom side of the frame. The leg brace is coupled to the frame and to each of the support legs. An upper portion of the leg brace is engaged with the frame for constraining at least fore and aft movement of the upper portion of the leg brace relative to the frame. A lower portion of the leg brace is engaged with each of the support legs for constraining at least fore and aft movement and lateral movement of each of the support legs relative to the lower portion of the leg brace. The handles each have a frame engaging body thereof engaged with a respective one of the handle mounting bodies of the frame to jointly define a respective handle coupling. Each handle coupling comprises a first tubular member, a second tubular member and a third tubular member. The second tubular member is engaged within a central passage of the first tubular member. The first tubular member is engaged within a central passage of the third tubular member. The second tubular member is fixedly attached to the third tubular member. The second tubular member extends from within the central passage of the third tubular member into the central passage of the first tubular member.

In one or more embodiments of the disclosures made herein, a kit for fabricating a wheelbarrow comprises a tub, support legs, a frame, a leg brace and handles. The frame has spaced-apart handle engaging bodies each at a rear portion of the frame. The leg brace has an upper portion and a lower portion. The upper portion of the leg brace and the frame are jointly configured for enabling the upper portion of the frame to be engaged with the frame for constraining at least fore and aft movement of the upper portion of the leg brace relative to the frame when the upper portion of the leg brace is engaged with the frame and wherein the lower portion of the leg brace. Each of the support legs and the lower portion of the leg brace are jointly configured for enabling the lower portion of the leg brace to be engaged with each of the support legs for constraining at least fore and aft movement and lateral movement of each of the support legs relative to the lower portion of the leg brace. The handles each have a frame engaging body thereof engageable with a respective one of the handle mounting bodies of the frame to jointly define a respective handle coupling. Each handle coupling comprises a first tubular member, a second tubular member and a third tubular member. The second tubular member is fixedly attached to the third tubular member. The first, second and third tubular members are jointly configured for enabling the second tubular member to be engaged within a central passage of the first tubular member and for enabling the first tubular member to be engaged within the central passage of the third tubular member.

In one or more embodiments, the second tubular member has a close-tolerance slip-fit within the central passage of the first tubular member and the first tubular member has a close-tolerance slip-fit within the central passage of the third tubular member.

In one or more embodiments, all of the tubular members have the same cross-sectional shape.

In one or more embodiments, the second and third tubular members are integral with a respective one of the handle.

In one or more embodiments, the first tubular member and the second tubular member each have one or more fastener holes extending therethrough.

In one or more embodiments, the second and third tubular members are integral with a respective one of the handle.

In one or more embodiments, the second and third tubular members of each handle are fixedly attached to an elongated body of a respective one of the handles.

In one or more embodiments, the upper portion of the leg brace resides within a laterally extending channel of the frame and the lower portion of the leg brace includes protruding stubs each engaged within a passage of a stub receptacle of a respective one of the support legs.

In one or more embodiments, each protruding stub has a close-tolerance slip-fit within the passage of the stub receptacle of the respective one of the support legs.

In one or more embodiments, each protruding stub and the passage of the stub receptacle of each support leg has a rectangular cross-sectional shape.

In one or more embodiments, the lower portion of the leg brace is engaged with each of the support legs for constraining fore and aft movement, lateral movement and 3-axis rotational movement of each of the support legs relative to the lower portion of the leg brace.

In one or more embodiments, the first and second tubular members are jointly dimensioned whereby the second tubular member has a close-tolerance slip-fit within the central passage of the first tubular member when engaged therewith and the first and third tubular members are jointly dimensioned whereby the first tubular member has a close-tolerance slip-fit within the central passage of the third tubular member when engaged therewith.

In one or more embodiments, the frame includes a laterally extending channel configured for having the upper portion of the leg brace disposed therein, the lower portion of the leg brace includes spaced-apart protruding stubs and each of the support legs includes a stub receptacle having a passage therein configured for having a respective one of the protruding stubs engaged therein.

In one or more embodiments, the protruding stubs and passage of the stub receptacle of each support leg are jointly dimensioned whereby each protruding stub has a close-tolerance slip-fit within the passage of the receptacle of the respective one of the support legs when engaged therewith.

In one or more embodiments, the lower portion of the leg brace and the support legs are jointly configured whereby engagement of the lower portion of the leg brace with the support legs constrains fore and aft movement, lateral movement and 3-axis rotational movement of each of the support legs relative to the lower portion of the leg brace.

These and other objects, embodiments, advantages and/or distinctions of the present invention will become readily apparent upon further review of the following specification, associated drawings and appended claims.

DETAILED DESCRIPTION

Referring now to FIGS. 1-5, aspects of a wheelbarrow configured in accordance with one or more embodiments of the disclosures made herein (i.e., wheelbarrow 100) are discussed. The wheelbarrow 100 comprises a plurality of interconnected discrete structural components implemented in a manner that enhances and maintains structural rigidity at the interconnections between such components. As discussed below in detail, such interconnection arrangement advantageously improves operability and longevity of use of the wheelbarrow 100 and other similar types of wheeled material transport structures that utilize such an implementation of the interconnected discrete structural components. Such an interconnection arrangement enhances the utility and value of the wheelbarrow 100 and other similar types of wheeled material transport structures that are intended to be shipped in an unassembled format.

Figure 1:
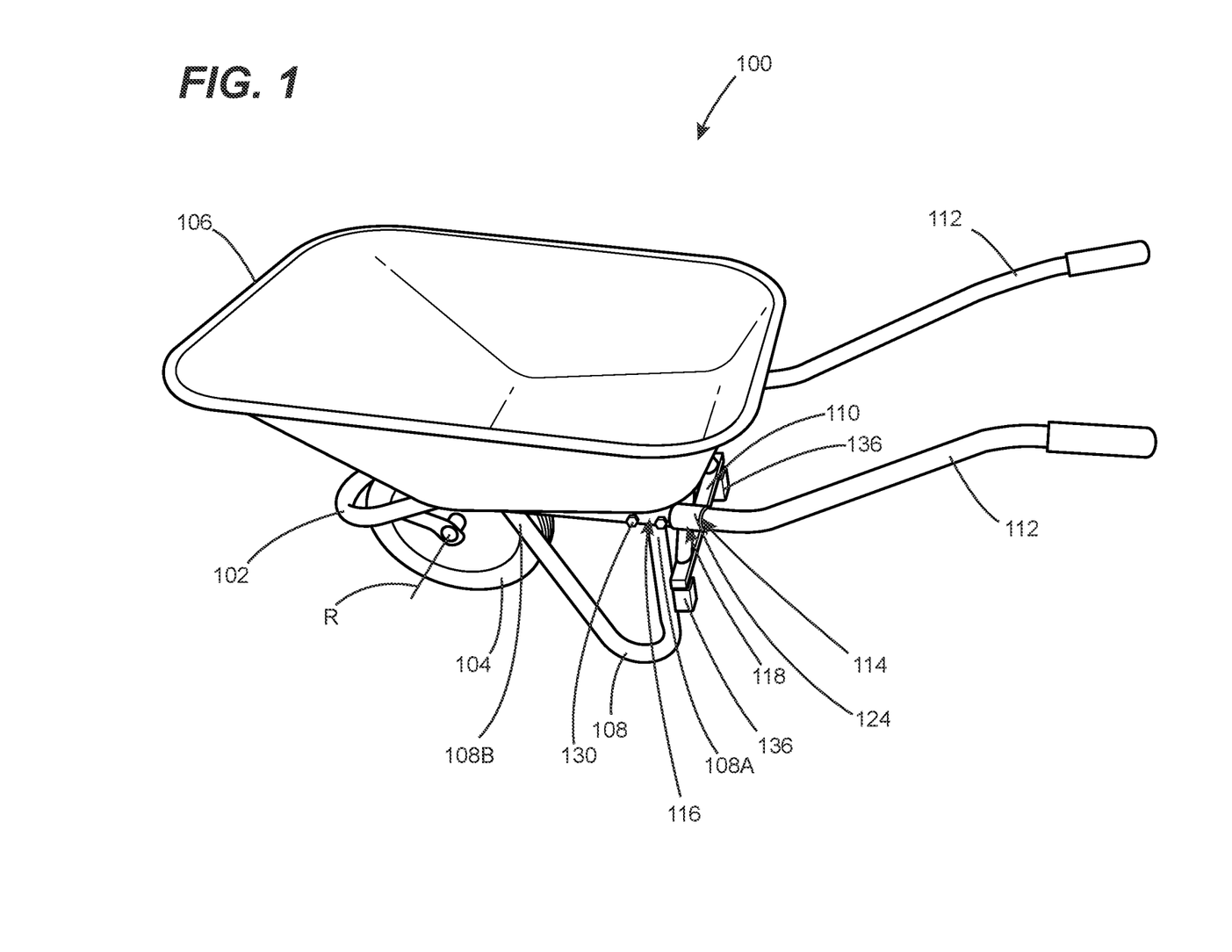
FIG. 1 is a perspective view showing a wheelbarrow in accordance with one or more embodiments of the disclosures made herein.

The wheelbarrow comprises a frame 102, a wheel 104, a tub 106, support legs 108, a leg brace 110 and handles 112. The wheel 104 is attached to and located below a forward portion of the frame 102 in a manner enabling the wheel 104 to be freely rotated about a rotational axis R extending through a central axis of the wheel 104. The tub 104 is attached to the frame 102 and extends above an upper surface of the frame 102. The handles 112 are attached to and extend rearwardly from a rear portion of the frame 102. The support legs 108 are each engaged with the frame 102 and extend below a lower surface of the frame 102. The leg brace 110 is engaged with the frame 102 and with each one of the support legs 108. As discussed below in detail, the handles 112 are each attached to the frame 102 in a manner that enhances and maintains structural rigidity at the interconnections therebetween and the leg brace 110 is engaged with the frame 102 and with each one of the support legs 108 in a manner that enhances and maintains structural rigidity at the interconnections therebetween and associated therewith.

Figure 3:
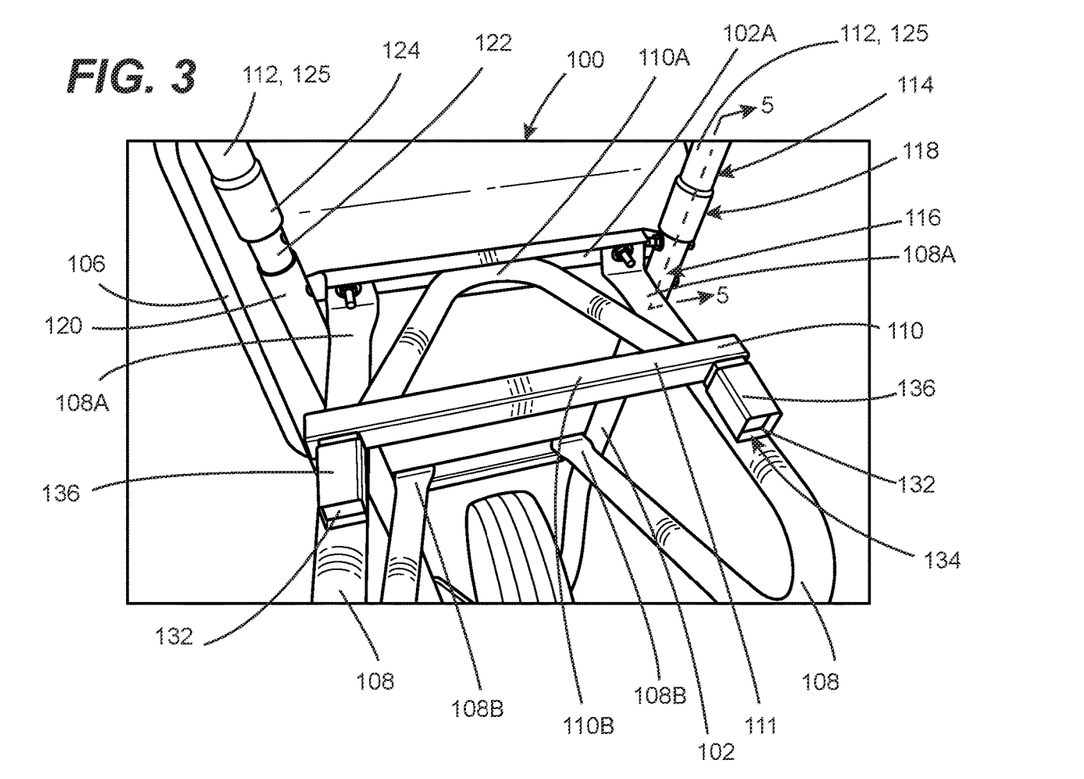
FIG. 3 is a second partial view of the wheelbarrow shown in FIG. 1.
Figure 7:
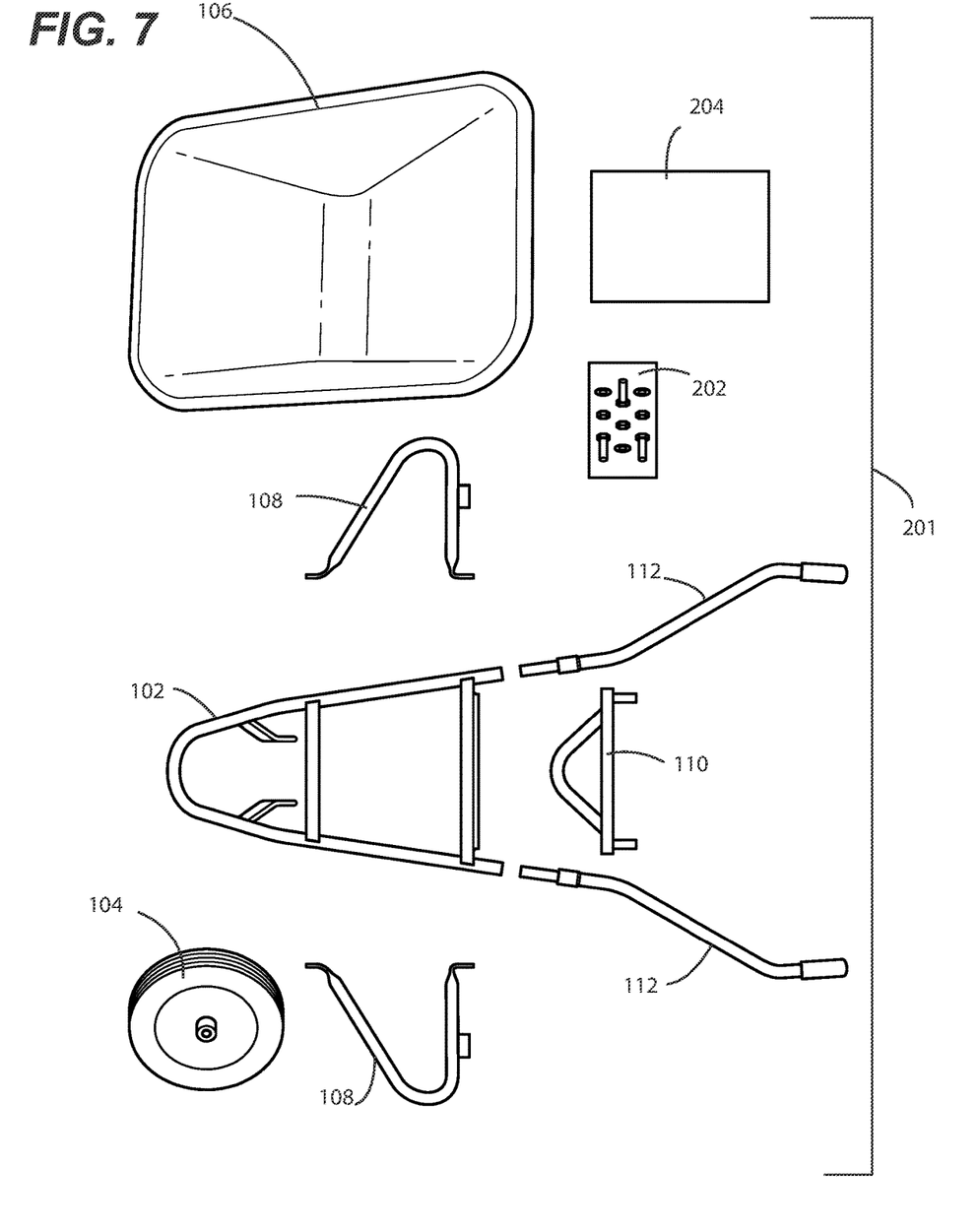
FIG. 7 is a top view showing components of the kit of FIG. 6.

It is well known that wheelbarrows may include one or more components that are used in pairs. For example, as shown in FIGS. 1, 3 and 7, the wheelbarrow 100 includes a pair of leg supports (i.e., the leg supports 108) and a pair of handles 112 (i.e., the handles 112). A person of ordinary skill in the art will be well aware that such components used in pairs may be identical to each other (e.g., as handles often are) or may different than each other (e.g., mirror images of each other as support legs often are). In regard to the disclosures made herein, use a single reference number to designate components used in a paired manner (e.g., spaced-apart) does not necessarily imply that such components are identical to each other.

Each of the handles 112 has a frame engaging body 114 at an end portion thereof. The frame 102 has spaced-apart handle engaging bodies 116 at a rear portion thereof. The frame engaging body 114 of each handle 112 is engaged with a respective one of the handle mounting bodies 116 to jointly define a respective handle coupling 118. Each handle coupling 118 comprises a first tubular member 120, a second tubular member 122 and a third tubular member 124. The second and third tubular members 122, 124 are integral with a respective one of the handles 112. For example, as shown, the second and third tubular members 122, 124 of each handle 112 are fixedly attached to an elongated body 125 of a respective one of the handles 112. In preferred embodiments, the second tubular member 122, the third tubular member 124 and the elongated body 125 of each handle 112 are fixedly attached to each other such as by welding. For example, the second and third tubular members 122, 124 can each be welded to the elongated body 125.

The second tubular member 122 is engaged within a central passage of the first tubular member 124 and the first tubular member 120 is engaged within a central passage of the third tubular member 124. The second tubular member 122 is preferably matingly engaged within the central passage of the first tubular member 124 and the first tubular member 120 is preferably matingly engaged within the central passage of the third tubular member 124. Such tubular members being matingly engaged within the respective central passage includes the second tubular member 122 having a close-tolerance slip-fit within the central passage of the first tubular member 120 and the first tubular member 120 has a close-tolerance slip-fit within the central passage of the third tubular member 124. In the context of the handle couplings 118, a close-tolerance fit involves inside dimension(s) of a tubular member and outside dimension(s) of an engaged tubular member enabling manual engagement of the two tubular members without the use of tools while inhibiting appreciable play between the two tubular members. For example, a clearance of a few thousands of an inch to a few hundreds of an inch will generally provide a suitable close-tolerance slip-fit as related to wheelbarrows and other similar types of wheeled material transport structures.

Figure 2:
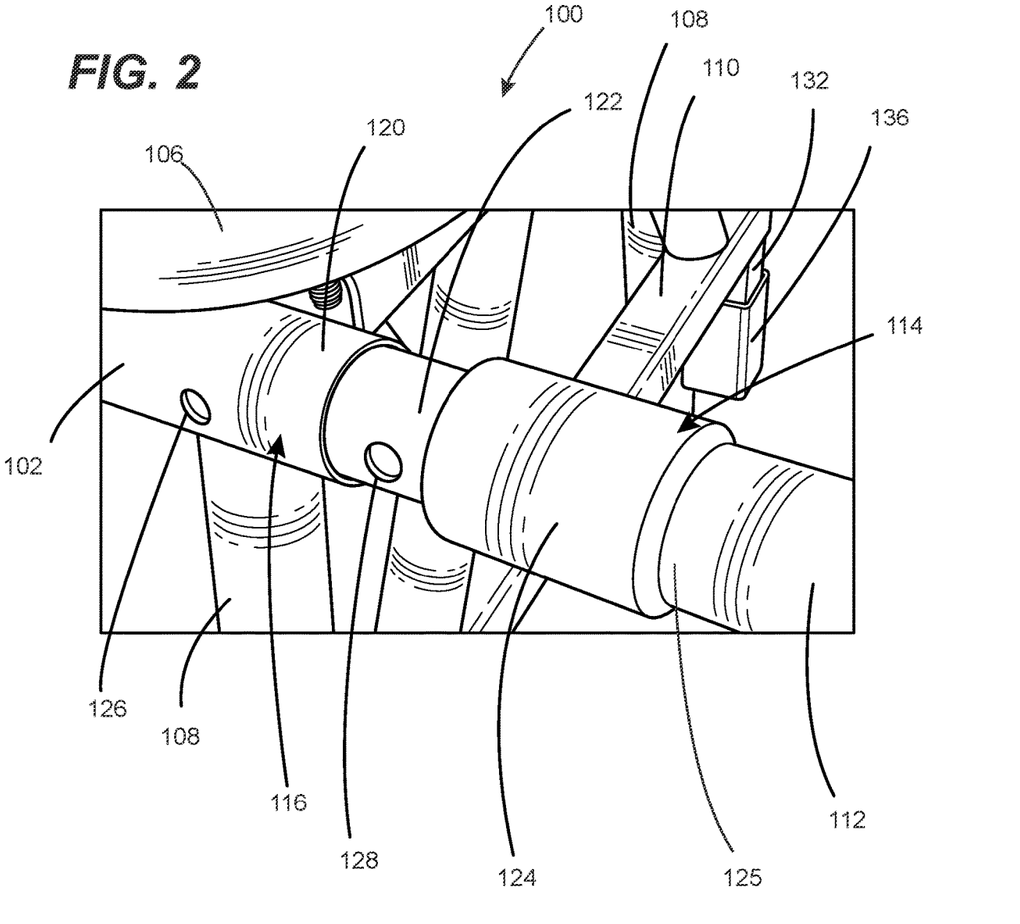
FIG. 2 is a first partial view of the wheelbarrow shown in FIG. 1.
Figure 4:
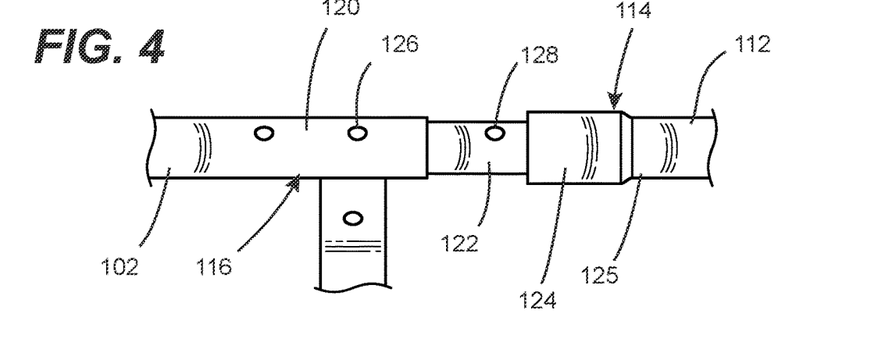
FIG. 4 is a fragmentary side view showing a handle and a frame of the wheelbarrow of FIG. 1, where the handle is partially engaged with the frame.
Figure 5:
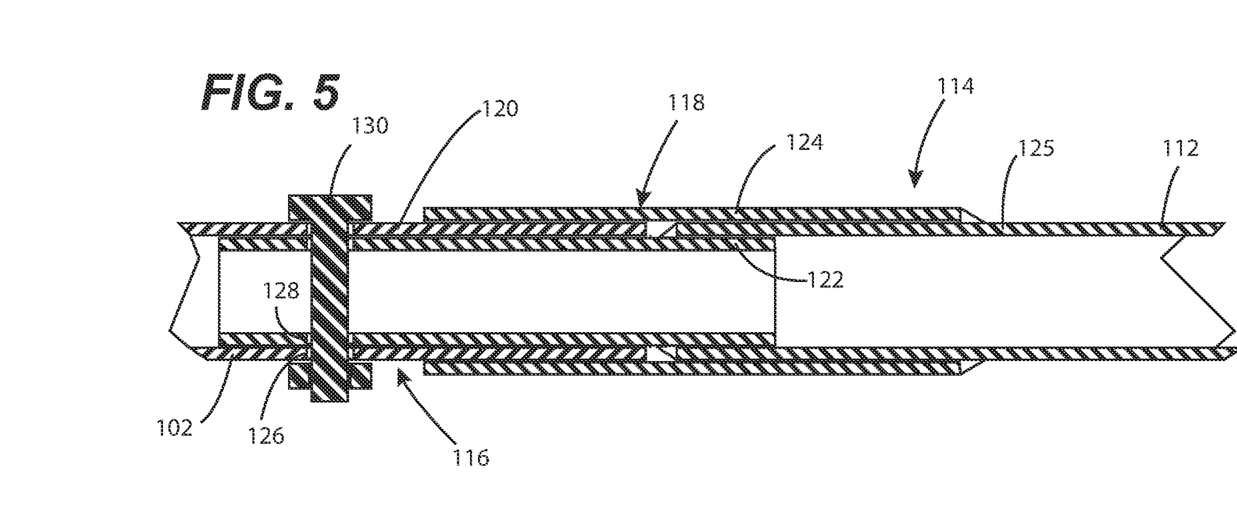
FIG. 5 is a cross-sectional view taken along line 5-5 in FIG. 3, where the handle is attached to the frame.

The second tubular member 122 extends from within the central passage of the third tubular member 124 into the central passage of the first tubular member 120. In one or more embodiments, as shown in FIGS. 2-4, the first tubular member 120 has one or more fastener holes 126 extending therethrough and the second tubular member 122 has one or more fastener holes 128 extending therethrough. As best shown in FIGS. 1 and 5, when the frame engaging body 114 of a handle 112 is fully engaged with the respective one of the handle engaging bodies 116, each of the one or more fastener holes 128 of the first tubular member 120 is aligned with a respective one of the one or more fastener holes 128 of the second tubular member 122. A fastener 130 may be engaged through each of the aligned fastener holes 126, 128 for fixedly securing the handle 112 to the frame 102.

In one or more embodiments, as shown, all of the tubular members 120, 122, 124 have the same cross-sectional shape—i.e., round. However, in one or more other embodiments, one or more of the tubular members 120, 122, 124 may have a cross-sectional shape different that round (e.g., square). The first tubular member 120 may be a solid rod or the like and still be a tubular member as relevant to the scope of the disclosures made herein.

In view of the disclosures made herein, a skilled person will appreciate that the structural arrangement of the handle coupling 118 may be used in other applications beside that of a wheelbarrow and other similar types of wheeled material transport structures. The structural arrangement of the handle coupling 118 provides exceptional rigidity between to interconnected bodies and, particularly, elongated members. Examples of such other application include, but are not limited to, tools (e.g., long-handled gardening tools, extension poles, etc.), support bodies for support structures (e.g., table legs, awning legs, etc.), building materials (e.g., fence posts, etc.) and the like.

The support legs 108 preferably have spaced-apart end portions 108A, 108B. A first end portion 108A of each support leg 108 is attached to the frame 102 at the rear portion of the frame 102 and a second end portion 108B of each support leg 108 is attached to the frame 102 at a position forward of the attachment location of the first end portion 108A. For example, as shown, the second end portion 108B of each support leg 108 may be attached to the frame 102 at a central portion thereof—i.e., a location between the front and rear portions of the frame 102. Placement, construction and shape of support legs for wheelbarrows and other similar types of wheeled material transport structures are well-known in the art. Accordingly, in view of the disclosures herein, a skilled person will appreciate further details as to placement, construction and shape of the support legs of wheel barrows configured in accordance with embodiments of the disclosures made herein.

The leg brace 110 is coupled to the frame 102 and to each of the support legs 108. In preferred embodiments, the leg brace 110 constrains movement of the support legs 108 relative to each other and relative to the frame 102. Advantageously, in a preferred embodiment as shown in FIG. 3, the leg brace 110 constrains movement of the support legs in multiple rotational and linear translational directions—i.e., fore and aft movement, lateral movement and 3-axis (orthogonal) rotational movement of each of the support legs 108 relative to the leg brace 110. Such constrained movement advantageously enhances and maintains structural rigidity at interconnections between the frame 102 and the support legs 108 to thereby improve operability and longevity of use of the wheelbarrow 100 (i.e., a wheel barrow configured in accordance with one or more embodiments of the disclosures made herein).

As shown in FIG. 3, in a preferred embodiment, the leg brace 110 (e.g., a tubular body) includes an upper portion 110A and a lower portion 110B. The upper portion 110A of the leg brace 110A is positioned within a laterally-extending channel 102A of the frame 102. The upper portion 110A of the leg brace 110 and the channel 102A are jointly dimensioned (e.g., via a close-tolerance slip-fit of the upper portion 110 within the channel 102A) for constraining fore and aft movement of the upper portion 110A of the leg brace 110 relative to the frame 102. The upper portion 110A of the leg brace 110 may have a close-tolerance fit with the channel 102A of the frame. In the context of the leg brace 110, a close-tolerance fit involves a width of the upper portion 110A of the leg brace 110 and a width of the channel 102A of the frame 102 enabling manual engagement of the upper portion 110A of the leg brace 110 within the channel 102A of the frame 102 without the use of tools while inhibiting appreciable play therebetween. Preferably, all portions of the leg brace 110 may be welded together.

In view of the disclosures made herein, a skilled person will appreciate that other interconnect structures may be used between the upper portion 110A of the leg brace 110 and the frame 102. Such other interconnect structures would provide the desired functionality of inhibiting unrestricted fore and aft (and optionally lateral) movement between the upper portion 110A of the leg brace 110 and the frame 102. For example, in other embodiments, a stub and receptacle structure or the like (as discussed below in reference to the lower portion 110B of the leg brace 110) may be utilized as an engagement means between the upper portion 110A of the leg brace 110 and the frame 102.

The lower portion 110B of the leg brace 110 is engaged with each of the support legs 108 for constraining fore and aft movement, lateral movement and rotational movement of each of the support legs 108 relative to the lower portion 110B of the leg brace 110. The lower portion 110B of the leg brace 110 includes protruding stubs 132 each engaged within a passage 134 of a stub receptacle 136 of a respective one of the support legs 110. Each protruding stub 132 and the passage of each stub receptacle 134 has a rectangular cross-sectional shape. In one or more other embodiments, each protruding stub 132 and the passage of each stub receptacle 134 may have a different cross-sectional shape—e.g., round. The protruding stubs 132 and passage 134 of each stub receptacle 136 are jointly dimensioned (e.g., via a close-tolerance slip-fit of the protruding stub 132 within the passage 134 of the stub receptacle 136) for constraining fore and aft movement, lateral movement and 3-axis (orthogonal) rotational movement of each of the support legs 108 relative to the leg brace 110.

Referring to FIG. 3, the leg brace 110 includes a cross-member 111. As shown, the upper portion 110A of the leg brace 110 includes a curved tubular member having opposing end portions thereof attached to the cross-member 111. As also shown, the protruding stubs 132 of the lower portion 110B of the leg brace 110 are each attached in a spaced-apart manner to the cross-member 111. It is disclosed herein that, in one or more embodiments, a central portion of the cross-member 111 may be omitted—e.g., all or a portion of the cross-member extending between the opposing end portions of the upper portion 110A of the leg brace 110. It is also disclosed herein that, in one or more other embodiments, the cross-member 111 may be omitted in its entirety and each of the protruding stubs 132 may be attached directly to upper portion 110A of the leg brace 110—e.g., each of the protruding stubs 132 attached directly to a respective end portion of the tubular member of the upper portion 110A of the leg brace 110. Omission or truncation of the cross-member 111 beneficially reduces weight of the wheelbarrow 100 and increases leg room between the support legs for a user of the wheelbarrow 100.

Figure 6:
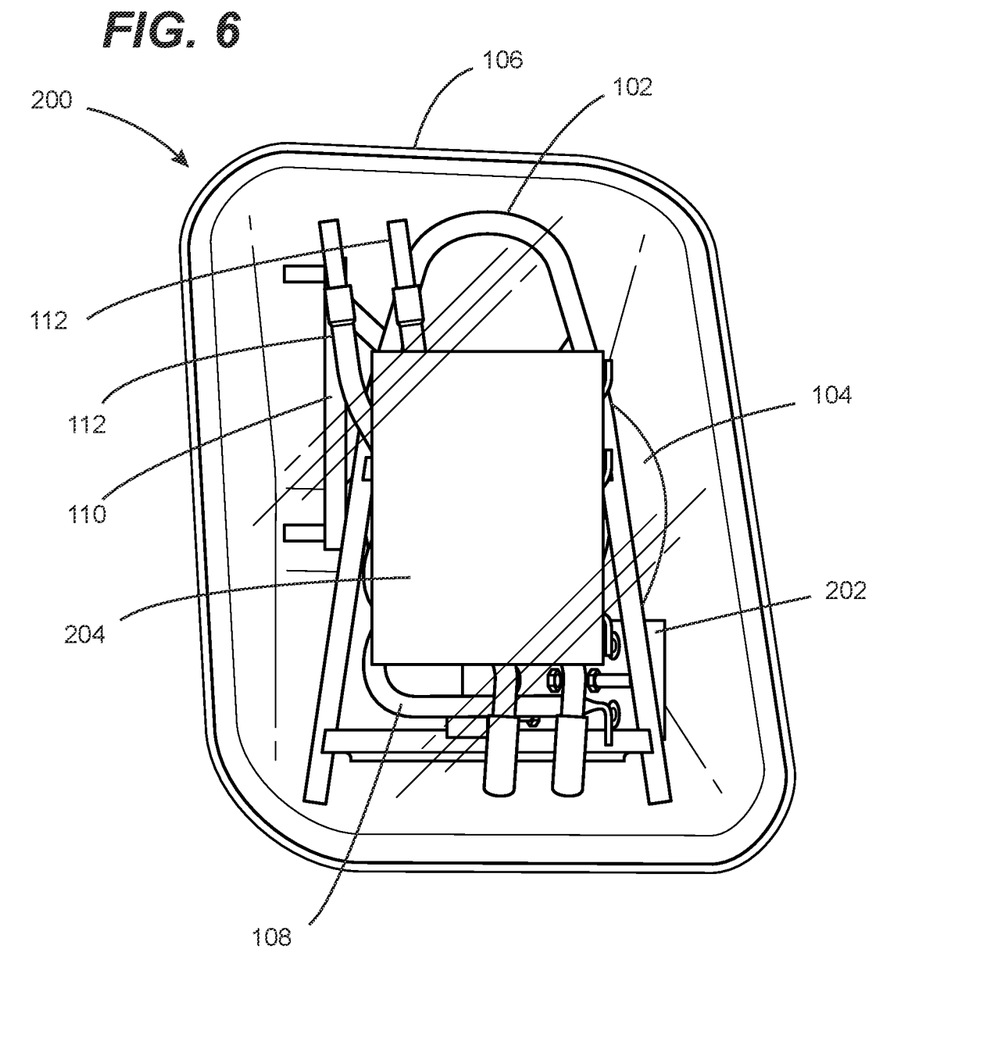
FIG. 6 is a top view showing a kit comprising components used for assembling the wheelbarrow of FIG. 1.

Referring now to FIGS. 6 and 7, the aforementioned wheelbarrow 100 is discussed in the context of a kit 200 (FIG. 6) from which the wheelbarrow 100 may be assembled and kit components 201 (FIG. 7) thereof. The kit 200 is in the form of a wheelbarrow product that is intended to be shipped in an unassembled format. The kit 200 include the aforementioned components of the wheelbarrow, a hardware package 202 and assembly instructions 204. Advantageously, as discussed above, the wheelbarrow 100 is formed by a plurality of discrete structural components that are configured to enhance and maintain structural rigidity at the interconnections between such components—i.e., particularly at the interconnections between the frame, handles and support legs. Such interconnection arrangement advantageously improves operability and longevity of use of the wheelbarrow 100 and other similar types of wheeled material transport structures that utilize such an implementation of the interconnected discrete structural components.

In one or more embodiments of the disclosures made herein, a kit for fabricating a wheelbarrow comprises a tub, support legs, a frame, a leg brace and handles. The frame has spaced-apart handle engaging bodies each at a rear portion thereof. The leg brace having an upper portion and a lower portion, wherein the upper portion of the leg brace and the frame are jointly configured for enabling the upper portion of the frame to be engaged with the frame for constraining at least fore and aft movement of the upper portion of the leg brace relative to the frame and wherein the lower portion of the leg brace. Each of the support legs are jointly configured for enabling the lower portion of the leg brace to be engaged with each of the support legs for constraining at least fore and aft movement and lateral movement of each of the support legs relative to the lower portion of the leg brace. The handles each having a frame engaging body thereof engageable with a respective one of the handle mounting bodies to jointly define a respective handle coupling. Each handle coupling comprises a first tubular member, a second tubular member and a third tubular member. The second tubular member is fixedly attached to the third tubular member. The first, second and third tubular members are jointly configured for enabling the second tubular member to be engaged within a central passage of the first tubular member and for enabling the first tubular member to be engaged within the central passage of the third tubular member.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

What is claimed is:

1. A wheelbarrow, comprising:
   a frame;
   support legs each engaged in a spaced-apart manner with a rear portion of the frame and extending from a bottom side of the frame;
   handles; and
   handle couplings each attaching a respective one of the handles to the frame, wherein each handle coupling comprises a first tubular member, a second tubular member and a third tubular member, wherein the second tubular member is engaged within a central passage of the first tubular member, wherein the first tubular member is engaged within a central passage of the third tubular member, wherein an end portion of the second tubular member protrudes out of the central passage of the third tubular member and extends into the central passage of the first tubular member, wherein the first tubular member is attached to the one of frame and the respective one of the handles, and wherein the second tubular member and the third tubular member are fixedly coupled to each other through a structural body of said one of frame and the respective one of the handles to which the first tubular member is not attached.

2. The wheelbarrow of claim 1, wherein: the frame includes a plurality of handle engaging bodies; and the first tubular member of each of the handle couplings is at least a portion of a respective one of the handle engaging bodies.

3. The wheelbarrow of claim 1 wherein the structural body is a portion of the respective one of the handles.

4. The wheelbarrow of claim 3 wherein the structural body is an elongated body of the respective one of the handles.

5. The wheelbarrow of claim 3 wherein the structural body of the respective one of the handles extends between the second tubular member and the third tubular member.

6. The wheelbarrow of claim 5 wherein all of the tubular members have the same cross-sectional shape.

7. The wheelbarrow of claim 1 wherein the second and third tubular members are welded to the structural body.

8. The wheelbarrow of claim 7 wherein the structural body of the respective one of the handles extends between the second tubular member and the third tubular member.

9. The wheelbarrow of claim 1 wherein:
   the first tubular member and the end portion of the second tubular member each have one or more fastener holes extending therethrough; and
   each of the one or more fastener holes of the first tubular member is aligned with a respective one of the one or more fastener holes of the end portion of the second tubular member.

10. The wheelbarrow of claim 9 wherein the second and third tubular members are welded to the structural body.

11. The wheelbarrow of claim 1 wherein:
    all of the tubular members have the same cross-sectional shape; and
    the second and third tubular members are welded to the structural body.

12. The wheelbarrow of claim 11, wherein: the frame includes a plurality of handle engaging bodies; and the first tubular member of each of the handle couplings is at least a portion of a respective one of the handle engaging bodies.

13. The wheelbarrow of claim 11 wherein the structural body is a portion of the respective one of the handles.

14. The wheelbarrow of claim 13 wherein the structural body is an elongated body of the respective one of the handles.

* * * * *